(12) United States Patent
Stessen et al.

(10) Patent No.: US 7,038,721 B2
(45) Date of Patent: May 2, 2006

(54) GAMMA CORRECTION CIRCUIT

(75) Inventors: Jeroen Hubert Christoffel Jacobus Stessen, Eindhoven (NL); Andrea Maccato, Sunnyvale, CA (US); Mitchell Oslick, Mountain View, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 516 days.

(21) Appl. No.: 10/076,352

(22) Filed: Feb. 15, 2002

(65) Prior Publication Data

US 2003/0156226 A1    Aug. 21, 2003

(51) Int. Cl.
*H04N 5/202*    (2006.01)
(52) U.S. Cl. ..................... 348/254; 348/674
(58) Field of Classification Search ........... 348/254, 348/255, 674, 676; 345/690
See application file for complete search history.

(56) References Cited

U.S. PATENT DOCUMENTS

| 5,282,036 A | 1/1994 | Worley, Jr. et al. ......... 358/164 |
| 5,933,199 A | 8/1999 | Yoon ........................... 348/674 |
| 6,166,781 A | 12/2000 | Kwak et al. ................. 348/674 |
| 6,570,611 B1 * | 5/2003 | Satou et al. ................. 348/189 |

FOREIGN PATENT DOCUMENTS

| DE | 19714886 A | 11/1997 |
| EP | 0382100 B1 | 2/1990 |
| EP | 0457522 B1 | 5/1991 |
| EP | 0762739 A2 | 9/1996 |
| EP | 0947975 A1 | 3/1999 |
| WO | WO9502299 | 6/1994 |

* cited by examiner

*Primary Examiner*—Victor R. Kostak
(74) *Attorney, Agent, or Firm*—Michael J. Ure

(57) ABSTRACT

A gamma correction circuit for correcting a digital video signal, the circuit comprising first (6) and second (8) lookup tables for storing discrete output intensity data and the associated slope data of a non-linear transfer function, respectively, for each of the discrete input video signal intensities, an adder (10) having a first input connected to the output of the first lookup table, a multiplier (12) having a first input connected to the output of the second look-up table (8), characterized by a quantizer (4) for providing the most significant bits of the incoming video signal to address the first (6) and second (8) lookup tables and to transfer the corresponding output intensity data to the adder (10) and the associated slope data to the multiplier (12), the quantizer (4) transmitting the remaining least significant bits of the input video signal to the second input of the multiplier (12), the multiplier (12) multiplying the slope data with the remaining least significant bits and feeding the multiplication result to the second input of the adder (10), the adder (10) adding the output intensity data and the multiplication result to generate a corrected video signal.

10 Claims, 3 Drawing Sheets

GAMMA CORRECTION CIRCUIT

FIELD OF THE INVENTION

The invention relates to a gamma correction circuit for correcting a digital video signal.

BACKGROUND OF THE INVENTION

Gamma correction is well known in the art to correct video intensity values for causing a linear range of video intensity values to be displayed on various displays. The video data obtained by photoelectric transfer and having a non-linear characteristic are corrected in accordance with a pre-given correction curve, the so-called gamma correction characteristic, so that the image is displayed as a linear gradation of intensities.

As typical video displays, for example cathode ray tubes (CRTs), have a non-linear transfer characteristics, i.e. the reproduced brightness on the CRT screen is a non-linear "gamma" function of the controlled-grid video drive (e.g. gamma=2.2). To achieve a linear gradation of intensities, the video signal at the TV transmitter side is pre-corrected (e.g. gamma=0.45) for a standard CRT display. When displayed graphics are produced by a workstation or when images are recorded by a camera etc., it is necessary to compensate for this non-linearity. To produce a linear gradation of intensities, this compensation is called gamma pre-correction. The CRT display performs the gamma post-correction, and these pre-and post corrections together make approximately a linear transfer function (gamma=1.0).

If the display plus receiver electronics differ substantially from the reference display in the studio, we need to apply some extra gamma correction. Another reason for wanting extra gamma correction is that the optimum value of the overall gamma depends on ambient light conditions: a linear transfer function (gamma=1.0) is not always best. It is the subject of this invention to provide a method for this extra gamma correction.

Different transmission standards may prescribe different gamma pre-corrections, and the type of display has a strong impact on the gamma post-correction characteristic, particularly on the value of the gamma correction factor. This correction factor of a CRT display depends among others on the output impedance of the video output amplifiers. Further it should be kept in mind that the broadcast images have been produced to look good on a studio monitor, thus it is the gamma correction factor of that studio monitor that actually defines the system value of the gamma pre-correction factor. Further, there are other display types that have a totally different transfer function, like PDP and DLP or the LCD-display. In all these cases, an extra gamma correction function must comply to these transfer functions to properly correct the distortion of the display.

A simple method of performing gamma correction on digitized intensity signals is known which translates each of the incoming n-bit red, green and blue color intensity values to compensated n-bit color intensity values using a color lookup table for each color. The lookup table is typically stored in a solid state memory and includes a range of color intensity values each of which is associated with the corresponding gamma-corrected intensity value. The gamma-corrected value is derived from the gamma correction characteristic and stored in the lookup tables. The gamma-corrected values read from the table may be converted into analog intensity signals that are displayed. This known solution is however, relatively inaccurate, resulting in a series of problems with having enough resolution in the blacks, particularly if the display requires gamma correction with a high gamma value.

EP 0 457 522 shows a circuit including a linear interpolator for performing a required gamma correction characteristic. This implementation approximates the gamma correction characteristic by line segments of a polygonal line, each of the line segments being a section of a straight line which is defined by slope data of the correction function at the input intensity and the intercept data of the straight line intercepting the output level axis Y at input level X=0%. By this known circuit, one lookup table stores the slope data, the second lookup table stores the intercept data, and the slope data multiplied by the input intensity is added to the intercept data to represent the output intensity. This known implementation is further optimized in EP 0 457 522 for gamma<1 by storing more data in the region near black where the differential gain is>>1. The problem of having enough resolution in the blacks, if the display needs full gamma correction with gamma>1 is, however, not addressed.

SUMMARY OF THE INVENTION

Therefore, the object underlying the invention resides in providing a gamma correction circuit which preserves a more precise approximation especially for small input intensities and for gamma>1.0. To this end, the invention provides a gamma correction as defined in the independent claims. The dependent claims define advantageous embodiments.

According to the invention, the lookup tables store discrete output intensity data and associated slope data for each of the input video signal intensities. The quantizer addresses the lookup tables by the most significant bits of the digitized input video signal intensity to read out the corresponding output intensity data and the associated slope data. The output intensity data are fed to the adder, the slope data are fed to the multiplier. The multiplier additionally receives the remaining bits of the input video signal intensity, multiplies the slope data with the remaining bits and couples the multiplication result to the adder. The adder performs an addition of the output intensity data and the multiplication result, this output being the corrected video signal, i.e. the gamma-corrected video signal, if the data stored in the two lookup tables correspond to the gamma correction characteristic. Whereas the circuit according to EP 0 457 522 multiplies the entire input video signal with the output from the second lookup table providing the slope data, the present invention multiplies only the least significant bits, i.e. the remainder of the input signal with the slope data. This reduces the hardware costs of the circuit without losing accuracy of the approximation.

In a preferred embodiment of the invention, the gamma correction characteristic has the form of $Y=X^{gamma}$, X being the input video signal, Y being the corrected output video signal, gamma being the correction factor. There are linear light displays, whose light output is linearly proportional to the input signal. Their gamma value is 1.0. Different transmission standards assume different gamma values, which typically are in the range of 2.2 to 2.8; linear-light displays therefore require strong gamma correction to compensate the transmission standard. In this case, the differential gain near black is then very low, and the two lookup tables must be programmed such that a strong non-linear gamma correction curve with gamma of 2.2 to 2.8 is stored. In the near black region, the approximation then suffers from severe quantization errors.

In accordance with a preferred embodiment of the invention, the transfer function in the two lookup tables approximate a modified, i.e. a reduced gamma correction characteristic, and the output signal generated at the output of the adder passes additional processing circuitry which converts the signal into an approximation of a fully gamma-corrected video signal. By this embodiment, the quantization errors resulting from the quantization of the transfer function in the lookup tables are definitely reduced by programming a reduced non-linear curve in the lookup table, and processing the output of the adder further to a fully gamma-corrected video signal will proceed without increasing the quantization errors too much.

In a preferred embodiment of the invention, the requested gamma correction characteristic is defined as $Y=X^{gamma}$, X being the uncorrected video signal at the input of the circuit, Y being the corrected video signal at the output of the circuit, and gamma is the correction factor. In this embodiment, the lookup tables approximate a transfer function $Y=X^{gamma/2}$, i.e. the non-linearity is reduced, and the quantization of such a flattened transfer function introduces reduced quantization errors. The output of the adder is then processed in the processing circuitry, i.e. in a squarer that squares the signal received from the adder. The squarer will double the value of gamma and output a fully gamma-corrected video signal, which is corrected by the factor gamma. If, for example, a gamma correction curve with gamma of 2.2 is to be realized, the lookup tables are programmed for a transfer function with gamma of 1.1, and the squarer will then double this value, so that the entire circuit realizes a gamma of 2.2 whereas the quantization errors correspond to a gamma of 1.1 and are thus remarkably reduced. In accordance with the invention, this additional processing is applied for gamma values larger than approximately 1.4.

In a preferred embodiment of the invention, the input video path is n bit wide, an intermediate video path is (q+p) bits wide and the output video path is r bit wide, $r \leq (q+p)$, and at the output of the adder and/or at the output of the processing circuitry an error propagation circuit is provided which separates M least significant bits of the gamma-corrected video signal and delays each sample of this signal by one pixel and adds these separated and delayed least significant bits to the gamma-corrected video signal which represents the next pixel, it being preferred that $M \geq (q+p-r)$.

The input video path is n bits wide (n=10). We choose a number p for the linear interpolation factor (p=4, meaning 16×interpolation). The (n−p) most significant bits (n−p=6) of the input signal are used to address the 2 lookup tables, then each lookup table has $2^{n-p}$ (=64) entries. We choose that each entry in the tables is q bits wide (q=10), q can be independent of n. After linear interpolation, the data is shifted left by the same number p of bits (p=4). The result becomes (q+p) bits wide (q+p=14). We can have a video output of only r bits wide (r=5 to 10). Then error propagation is used to remove (quantize) the (q+p−r) (=9 to 4) least significant bits, and r bits remain.

In another embodiment of the invention, the input video signal X at the input is n bit wide, the data of the transfer function stored in the lookup tables being q bits data. The output of the first lookup table will —q bits wide —be shifted to the left by p bits so that (q+p) bits are fed to the first input of the adder. The multiplier outputs a (q+p) bits signal to the second input of the adder which generates and outputs a (q+p) bits signal. If the circuit includes the processing circuitry, this processing circuitry receives the (q+p) bits signal from the adder and outputs a modified (q+p) bits signal. The gamma-corrected video signal is either output at the adder or at the processing circuitry, this gamma-corrected video signal being (q+p) bits wide.

If the quantization of the signal is carried out in accordance with this circuit design, gamma-corrected video signals are realized with almost (q+p) bits resolution, which may be the accuracy needed for some types of transmission and displays.

If, however, only a r bit wide output path to the display is present, the additional (q+p−r) bits of resolution are preserved and separated in an error propagation unit which adds these extra (q+p−r) bits, i.e. the least significant bits of each signal representing a pixel, to the right neighboring, i.e. following up pixel. This transfer of discarded bits from one pixel to the following up pixel reduces the visibility of the quantization errors, keeping the low frequency component of the quantization noise small.

This embodiment of the invention is a form of noise shaping, the feedback of the least significant bits by error propagation suppresses the low frequency part of the spectrum of the quantization noise. Perceptually this is the more important part, so the quantization will be less visible. Even if the output video path is only r bits wide, $r \leq (q+p)$, the gamma correction circuit perceptually preserves a much better quality. If for example the output path has a width of 5 to 10 bits, the output quality can be preserved much higher, for example up to 14 bits. This allows the use of cheaper interlinks or cheaper D/A converters, i.e. 8 bit converters and still claim 10 or more bits of precision. Noise shaping by itself is not a new invention. We use it here to preserve most of the extra precision that is created by the linear interpolation of the gamma lookup table and/or by the extra processing circuitry (the squarer).

In a preferred embodiment of the invention, the input path is n=10 bits wide, the lookup tables are of q=10 bits type, the multiplier, the adder and the processing circuitry are of (q+p)=14 bits type. The output path may be an r=8 bits display or D/A converter and thus, the circuit outputs only the 8 most significant bits, and at least the (q+p−r)=6 least significant bits may undergo the error propagation procedure in the error propagation circuit.

Hence, according to the invention, the gamma correction circuit particularly improves the smoothness of the output signal, and the optional processing circuitry reduces the quantization error significantly near the black, when a large value of gamma is desired, which is typically for linear-light displays. The optional error propagation reduces the average quantization error even more, which allows the use of cheaper interlinks or cheaper D/A converters at the output, at the cost of creating only some high frequency quantization noise.

DESCRIPTION OF PREFERRED EMBODIMENTS

Figure 1:
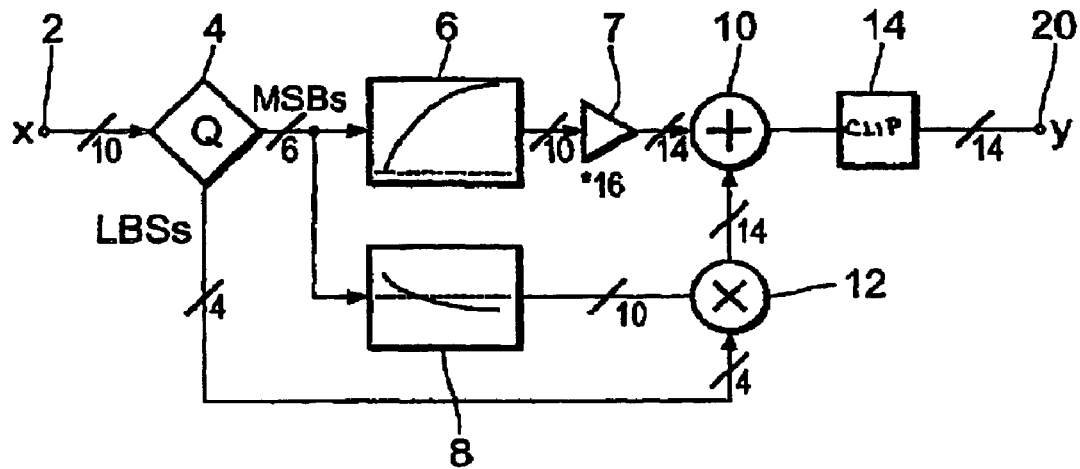
FIG. 1 shows a block diagram of a first embodiment of the invention.
Figure 2:
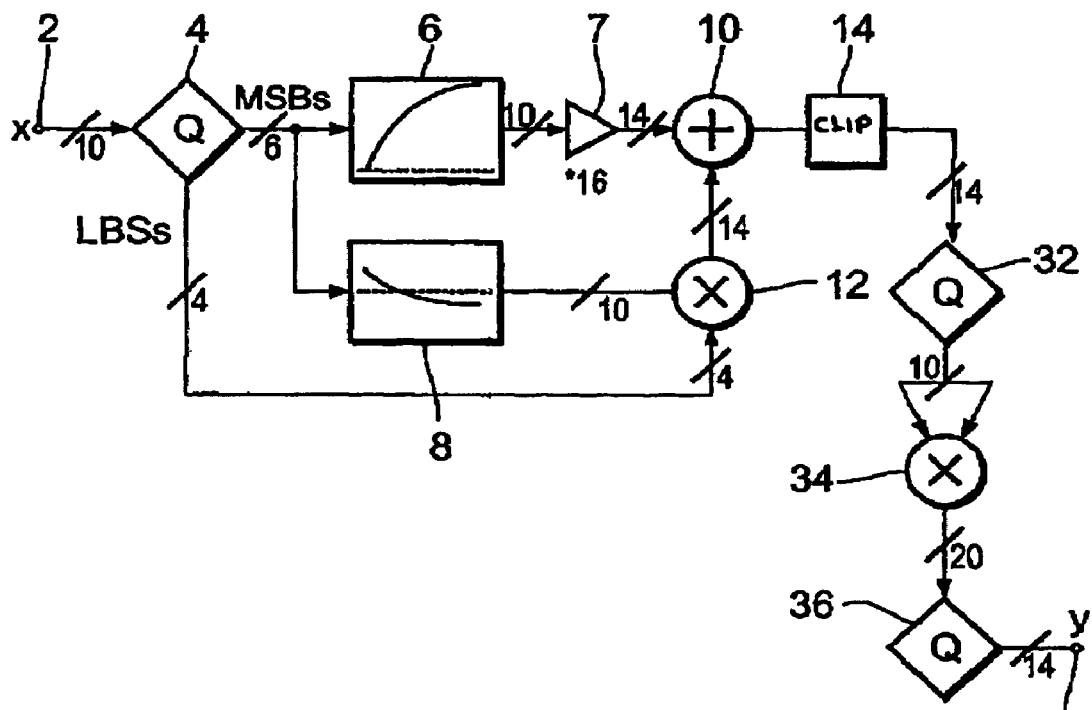
FIG. 2 shows a block diagram of a second embodiment of the invention.
Figure 3:
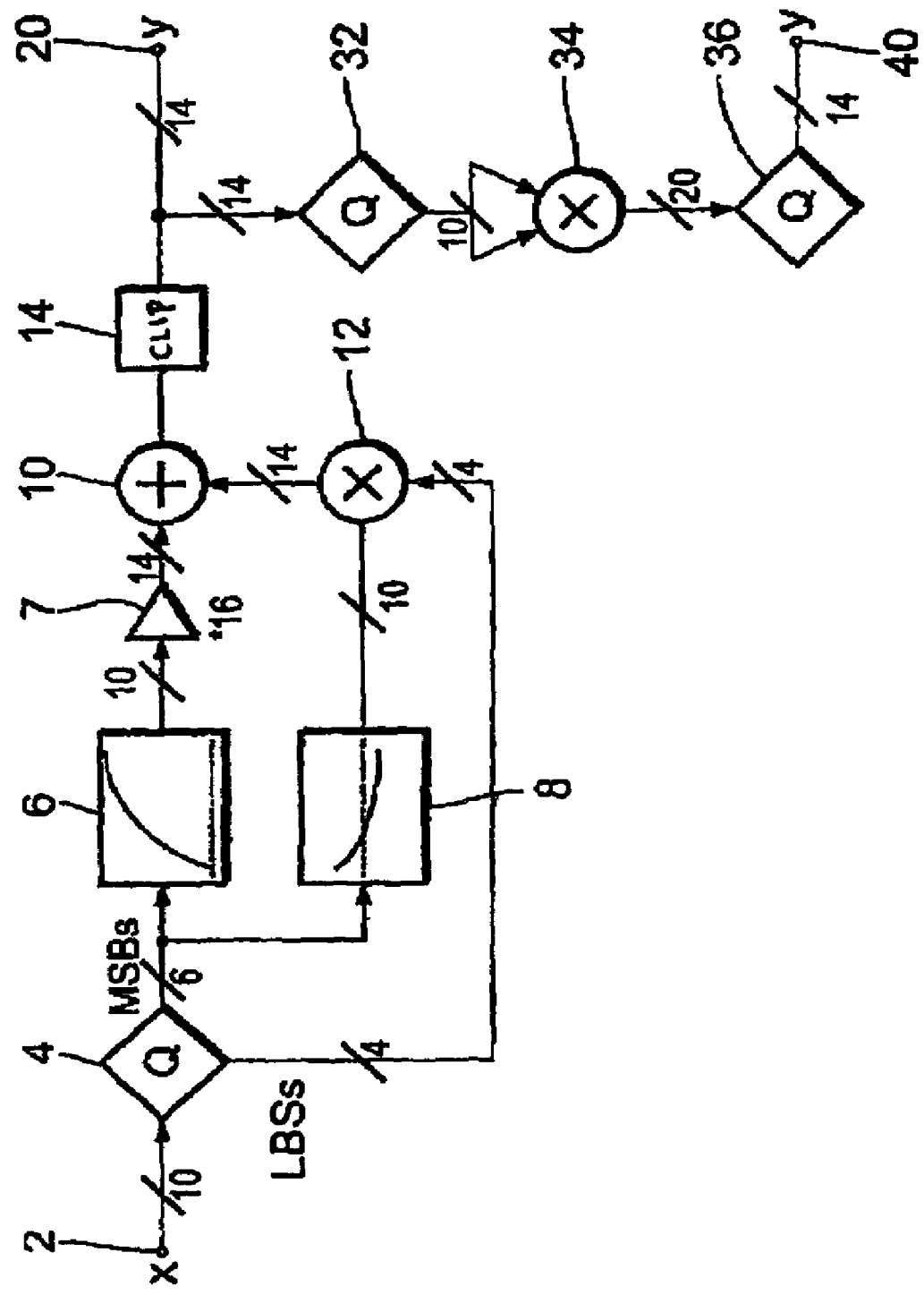
FIG. 3 shows a block diagram of a third embodiment of the invention.

FIGS. 1, 2 and 3 show three different embodiments of a gamma correction circuit according to the invention, all three embodiments include however, the same basis design. The circuit includes a first lookup table 6 for storing discrete output intensity data of a non-linear transfer function, and it includes a second lookup table 8 for storing the slope data of the non-linear transfer function, associated to the respective output intensity data stored in the first lookup table. The respective output intensity data and the associated slope data are stored in the first and second lookup table 6, 8 under the same address, this address being defined by the corresponding input video signal intensities of the input signal.

The output of the first lookup table is connected via shifting unit 7, the operation of which will be described later, to the first input of an adder 10. The output of the second lookup table 8 is connected to a first input of a multiplier 12, the output of which is connected to the second input of the adder 10.

The incoming video signal comes in at the input 2 and is fed to a quantizer 4 which provides the most significant bits of the incoming video signal to address the first and the second lookup table 6, 8. The remaining least significant bits are fed from the quantizer 4 to the second input of the multiplier 12, which multiplier 12 multiplies the addressed slope data from the second lookup table 8 with the remaining least significant bits from the incoming video signal. This multiplication result is transferred to the second input of the adder 10. As a consequence, the adder 10 adds the multiplication result from the multiplier 12 to the addressed output intensity data read out from the first lookup table 6. The adder 10 generates a corrected video signal at its output 20 and this corrected video signal is corrected in accordance with the transfer function stored in the lookup table 6 and 8.

If for example, the transfer function is the gamma correction characteristic, defined for example as $Y=X^{gamma}$, X being the input video signal, Y being the output video signal, then the video signal experienced the required gamma correction. At the output of the adder 10 a clipping function is applied at 14 before the video signal is output at 20.

FIG. 2 shows a second embodiment of the gamma correction circuit, which is identical with the first embodiment from the input 2 to the output of the clipping element 14. The output of the clipping element 14 is however fed to a processing circuitry 32, 34, 36, 40, which includes a second quantizer 32 followed by a squarer 34 which is followed by a third quantizer 36 which presents the corrected video signal at the output 40.

The circuit according to FIG. 2 is preferably realized for a gamma correction characteristic $Y=X^{gamma}$, if the correction factor 'gamma' is comparatively large and has a value of approximately 1.4 or more. Realizing such a large gamma by the circuit according to FIG. 1 would result in severe quantization errors in the black area, cf. FIG. 4. To avoid these quantization errors, the transfer function realized in the lookup tables 6, 8 establishes only a modified, i.e. reduced gamma correction establishing for example the characteristic $Y=X^{gamma/2}$, and the output of the adder 10 then passes the squarer 34 which squares the input, thus doubling the value of gamma, so that the video output signal 40 is fully gamma-corrected. As the squarer 34 does not introduce additional quantization errors, the quantization error of the output signal results only from the quantization by the lookup table 6, 8 and since the transfer function realized by the lookup tables shows rather smooth non-linearity, the quantization error is small.

FIG. 3 shows a third embodiment of the gamma correction circuit, which corresponds to the circuit of FIG. 2. In addition to output 40 this circuit includes, however, an output 20 at the output side of the clipping element 14. As a consequence, this circuit may either implement the embodiment according to FIG. 1 or the embodiment according to FIG. 2, depending on whether a large gamma>1.4 must be realized or not. If so, the lookup tables 6, 8 will be programmed to realize a rather smooth non-linear transfer function, and one part of the gamma correction is done in the processing section 32–40, and the gamma-corrected video signal is output at 40. If however only a gamma<1.4 is to be realized, then the lookup table may be programmed such that the transfer function is mapping the full gamma correction characteristic, the gamma-corrected video signal is then output at the output 20.

In the circuits according to FIGS. 1, 2 and 3, the input signal is a n bit signal, the lookup tables are of q bit type, the output of the first lookup table is shifted by p bits to the left so that the (q+p) bits signal is fed to the adder. The multiplier 12 also outputs a (q+p) bits signal, so that the adder 10 and the clipping element 14 emit a (q+p) bits signal.

The quantizer 4 at the input of the circuit transmits (n−p) most significant bits as addresses to the lookup tables 6, 8, the p least significant bits are transmitted to the multiplier 12. If the embodiment according to FIG. 2 is realized, the (q+p) bits signal passes the quantizer 32 which transfers a q bits signal to the squarer 34. The squarer outputs a (2·q) bits signal which passes the quantizer 36 and is output at 40 as a (q+p) bits signal. If for example, q=10 and p=4 this allows a quality of output data that is more likely 14 bits to arrive at a gamma-corrected video signal of almost 14 bits solution which is a sort of accuracy which is needed for example for linear-light signals. Particularly for gamma>1.4, i.e. when the video signal passes the processing section 32 to 40, and the lookup tables are programmed for a smooth transfer function, there is relatively less quantization error and yet, there is a quality of output data that is more like 14 bits. The only added cost is the processing section, which may include a 10×10 bits squarer with 14 bits output. This processing section is used whenever gamma exceeds a pre-given value, for example 1.4.

Figure 4:
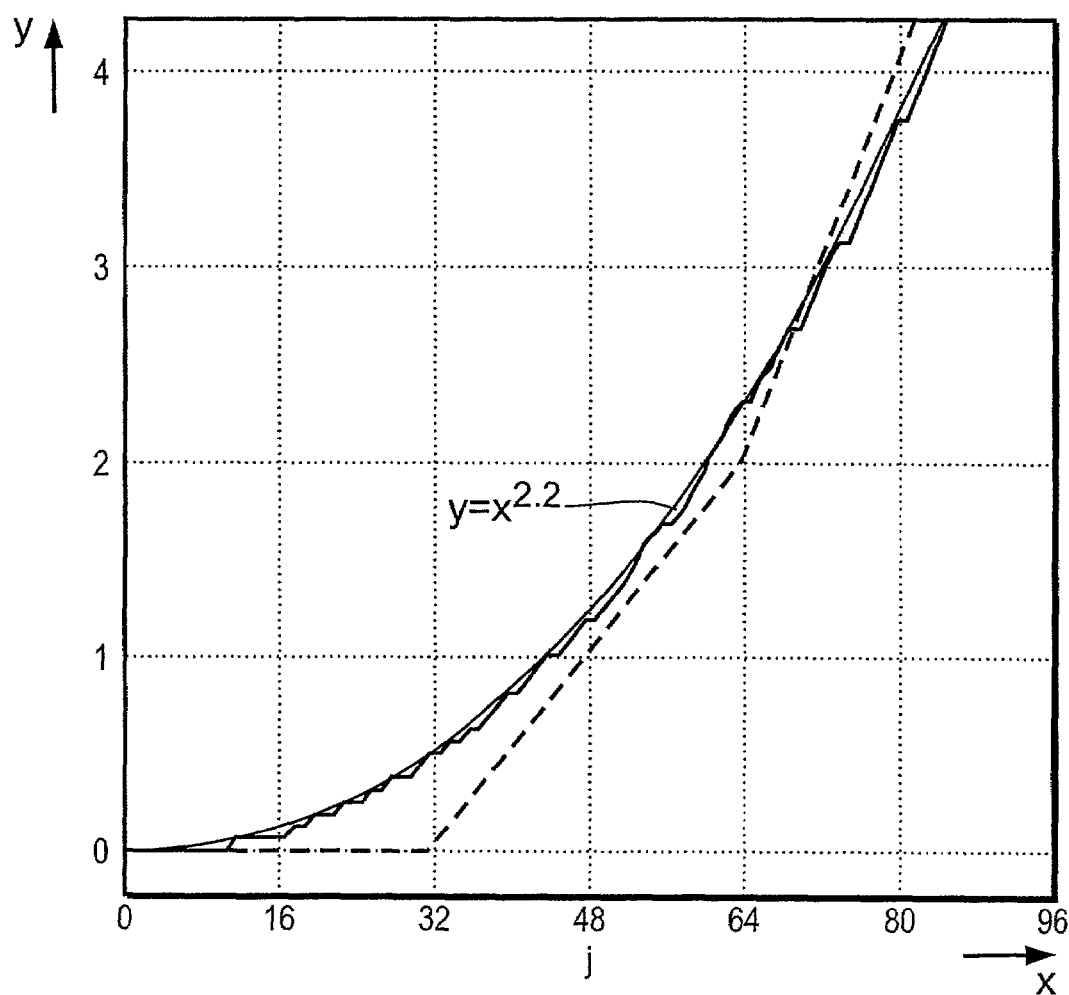
FIG. 4 shows a typical transfer function and the approximation realized by the embodiment according to FIG. 1 and FIG. 2, respectively.

FIG. 4 illustrates how the video output signal at the output 20 and the video output signal emitted at output 40 defer from the ideal gamma transfer function $y=X^{gamma}$, gamma=22, whereby the bottom part of the curve Y=X of 2.2 has been expended for showing more details.

The smooth thin solid line in the example of FIG. 4 is the ideal gamma correction characteristic $Y=X^{2.2}$. The fat dashed line is the best approximation to that ideal gamma characteristic that can be made with a 64-segment linear interpolation with 10-bits values in the lookup tables 6, 8. The fat solid line is the approximation of the ideal gamma characteristic whereby the lookup tables 6, 8 are programmed for $Y1=X^{1.1}$, and this signal then passes the processing circuitry 32, 34, 36, in which the squarer 34 generates at the output 40 the video output signal $Y=Y1^2$. The error of the fat solid line is remarkably smaller than that of the fat dashed line. Due to the high sensitivity of the human eye in dark areas, the perceived improvement will be even more significant.

Figure 5:
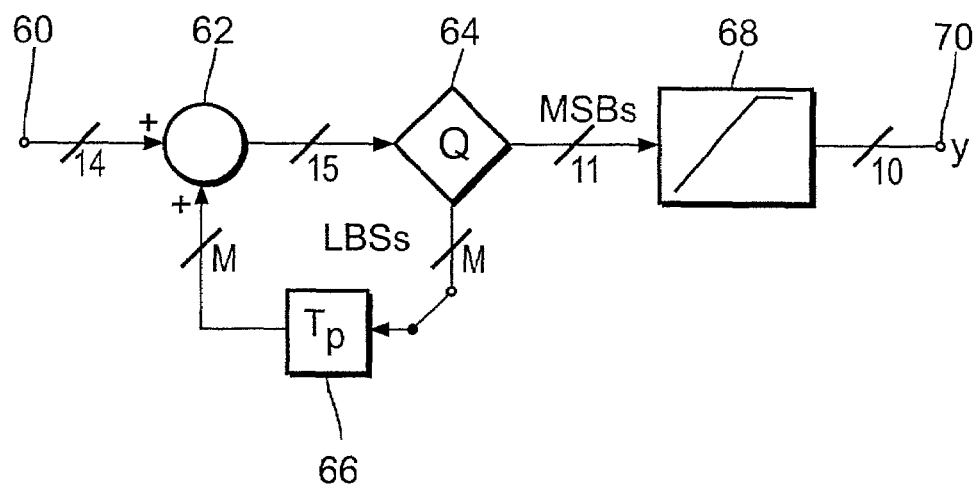
FIG. 5 shows a block diagram of an error propagation circuit.

FIG. 5 shows an error propagation section of the circuit, which may be connected optionally at the output 20 and/or 40 of the gamma correction circuit shown in FIGS. 1, 2 or 3. The input 60 of the error propagation circuit is followed by a second adder 62, which is followed by a quantizer 64. The quantizer 64 separates the M least significant bits of the gamma-corrected video signal and passes these M bits through a pixel delay 66 back to the adder 62.

As the pixel delay 66 delays the M bits by one pixel, these M bits are added to the next following up pixel. The M least significant bits are defining the quantization error from each pixel. This quantization error is added to the neighboring pixel of the image, which will reduce the average quantization error, keeping the quantization noise small, thus realizing a form of noise-shaping.

The feedback of the M least significant pixels in FIG. 5 suppresses the low frequency part of the spectrum of the quantization noise, which is perceptually the more important part, so that the quantization will be less visible. The r most significant bits leaving the second quantizer 64 pass a traditional clipping unit 68 and are then output at output 70. If the input video path is, for example, n=10 bits wide, and the video output path is also r=10 bits wide, then preferably all M=4 extra bits generated in the preceding circuit section are separated by the second quantizer 64, delayed by one pixel and added to the next pixel.

More generally, if the input video path is n bits wide, the lookup table entries are q bits wide, the linear interpolator adds p bits, and the output path is r bit wide, r<(q+p), then the error propagation section 60–70 may delay M≧(q+p−r) bits by one pixel and use it for propagating the quantization error.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A gamma correction circuit for correcting a digital video signal, the circuit comprising: a first lookup table (6) and a second lookup table (8) for storing discrete output intensity data and the associated slope data of a non-linear transfer function, respectively, for each of the discrete input video signal intensities, an adder (10) having a first input connected to the output of the first lookup table (6), a multiplier (12) having a first input connected to the output of the second look-up table (8), characterized by a quantizer (4) for providing the most significant bits of the incoming video signal to address the first and second lookup tables (6, 8) and to transfer the corresponding output intensity data to the adder (10) and the associated slope data to the multiplier (12), the quantizer (4) transmitting the remaining least significant bits of the input video signal to the second input of the multiplier (12), the multiplier (12) multiplying the slope data with the remaining least significant bits and feeding the multiplication result to the second input of the adder (10), the adder (10) adding the output intensity data and the multiplication result to generate a corrected video signal; the input video path being n bits wide, the internal path being (q+p) bits wide, and the output video path being r bits wide, r≦(q+p), wherein the circuit includes an error propagation circuit (60–70) at the output of the adder (10) and/or at the output of the processing means (32–40), M least significant bits of the gamma-corrected video signal of each pixel being delayed by one pixel and added to the gamma-corrected video signal of the following next pixel.

2. A gamma correction circuit according to claim 1, wherein data of the transfer function stored in the first lookup table (6) and the second lookup table (8) approximate the gamma correction characteristic.

3. Gamma correction circuit according to claim 1, wherein the transfer function in the first lookup table (6) and the second lookup table (8) approximate a modified gamma correction characteristic, and wherein the signal generated by the adder (10) is convened in processing means (32–40) into an approximation of a fully gamma-corrected video signal.

4. Gamma correction circuit according to claim 3, the requested gamma correction characteristic being defined as $Y=X^{gamma}$, X being the uncorrected video signal, Y being the corrected video signal, gamma being the correction factor, wherein the lookup tables (6, 8) approximate a transfer function $Y=X^{gamma/2}$, wherein the processing means includes a squarer (34) which squares the signal received from the adder (10) to output a fully gamma-corrected video signal, corrected by the correction factor gamma.

5. Gamma correction circuit according to claim 1, wherein the lookup tables (6, 8) approximate a transfer function $Y=X^{gamma}$, and the adder (10) outputs the gamma-corrected video signal, if gamma is below a pre-given value, and wherein the lookup tables (6, 8) approximate a transfer function $Y=X^{gamma/2}$, and the processing means (32–40) outputs the gamma-corrected video signal, if gamma is above the pre-given value.

6. Gamma correction circuit according to claim 5, wherein the pre-given value of gamma is approximately 1.4.

7. Gamma correction circuit according to claim 1, wherein M≧(q+p−r).

8. Gamma correction circuit according to claim 1, wherein the error propagation circuit (60–70) includes in series a second adder (62) and a second quantizer (64), the second quantizer (64) separating the M least significant bits of the gamma-corrected video signal and passing the M bits through a pixel delay (66) which delays the M bits by one pixel back to the second input of the second adder (62).

9. Gamma correction circuit according to claim 1, wherein the input video signal X at the input is n bits wide, the data of the transfer functions stored in the lookup tables (6, 8) being q bits data, the output of the first lookup table (6) being shifted to the left by p bits, so that (q+p) bits are fed to the first input of the adder (10), the multiplier (12) outputs a (q+p) bits signal to the second input of the adder (10) which outputs a (q+p) bit signal, or wherein the processing means (32–40) receives the (q+p) bit signal from the adder (10) and outputs a (q+p) bit signal, either the output of the adder (10) or the output of the processing means (32–40) being the gamma-corrected video signal, the signal passing an error propagation circuit (60–70) in which the M least significant bits of the gamma-corrected video signal of each video pixel are added to the gamma-corrected video signal of the next pixel and an r bits signal being output as noise shaped gamma-corrected video signal.

10. Gamma correction circuit according to claim 9, wherein the input video path is n bits wide, the output video path is r bits wide, n=10, p=4, q=10, M=9 to 4, r=5 to 10, and M≧(q+p−r).

* * * * *